INVENTORS:
ROSS H. GOODRICH
NEAL W. DENSMORE

ATTORNEY

July 21, 1953   R. H. GOODRICH ET AL   2,646,475
ELECTRIC SWITCH AND POWER TAKE-OFF DEVICE
Filed March 29, 1951   3 Sheets-Sheet 3

INVENTORS:
ROSS H. GOODRICH
NEAL W. DENSMORE
BY John F. Schmidt
ATTORNEY

Patented July 21, 1953

2,646,475

UNITED STATES PATENT OFFICE 2,646,475

ELECTRIC SWITCH AND POWER TAKE-OFF DEVICE

Ross H. Goodrich and Neal W. Densmore, Claremont, N. H., assignors to Joy Manufacturing Company, Pittsburgh, Pa., a corporation of Pennsylvania Application March 29, 1951, Serial No. 218,124

19 Claims. (Cl. 200—51.09)

This invention relates to an electric switch and power take-off device, especially to a device which is explosion-proof and is thus in the category of permissible devices for use in mines or other applications where explosive gases may be present.

In underground mining, particularly coal mining, there is always the possibility of the presence of combustible gases. The presence of such gases raises a peculiar problem particularly where electrical machinery is used in connection with mining operations. It is necessary that such machinery be operable in a manner that will not produce an electric spark such as would ignite combustible gases if they were present. This particular problem takes on a special emphasis in the case of equipment which connects and disconnects electrical machinery from such electric power outlets as may be provided in the mine. Means must be provided whereby the power line for the electric machinery can be connected and disconnected at will whenever necessary without incurring the risk of an explosion by having combustible gases ignited by a spark generated by the plugging in or unplugging of such equipment.

Accordingly it is an object of this invention to provide an electric switch and power take-off device which enables an operator to plug a machine into a power outlet which is "dead" so far as voltage is concerned at the time of the actual plugging in, but which can immediately after plugging in be switched on by the operator in order that power may be applied to the mechanism as desired. This and other objects are accomplished in an electric switch and power take-off device which provides an electric switch in an explosion-proof chamber, the switch having an operating handle which is actuatable upon rotation of the plug after its insertion into the socket provided in the device. In addition, the device is polarized in order that the plug may not be inserted when the switch is on, and may not be pulled out or disconnected unless the switch is off.

Figure 1:
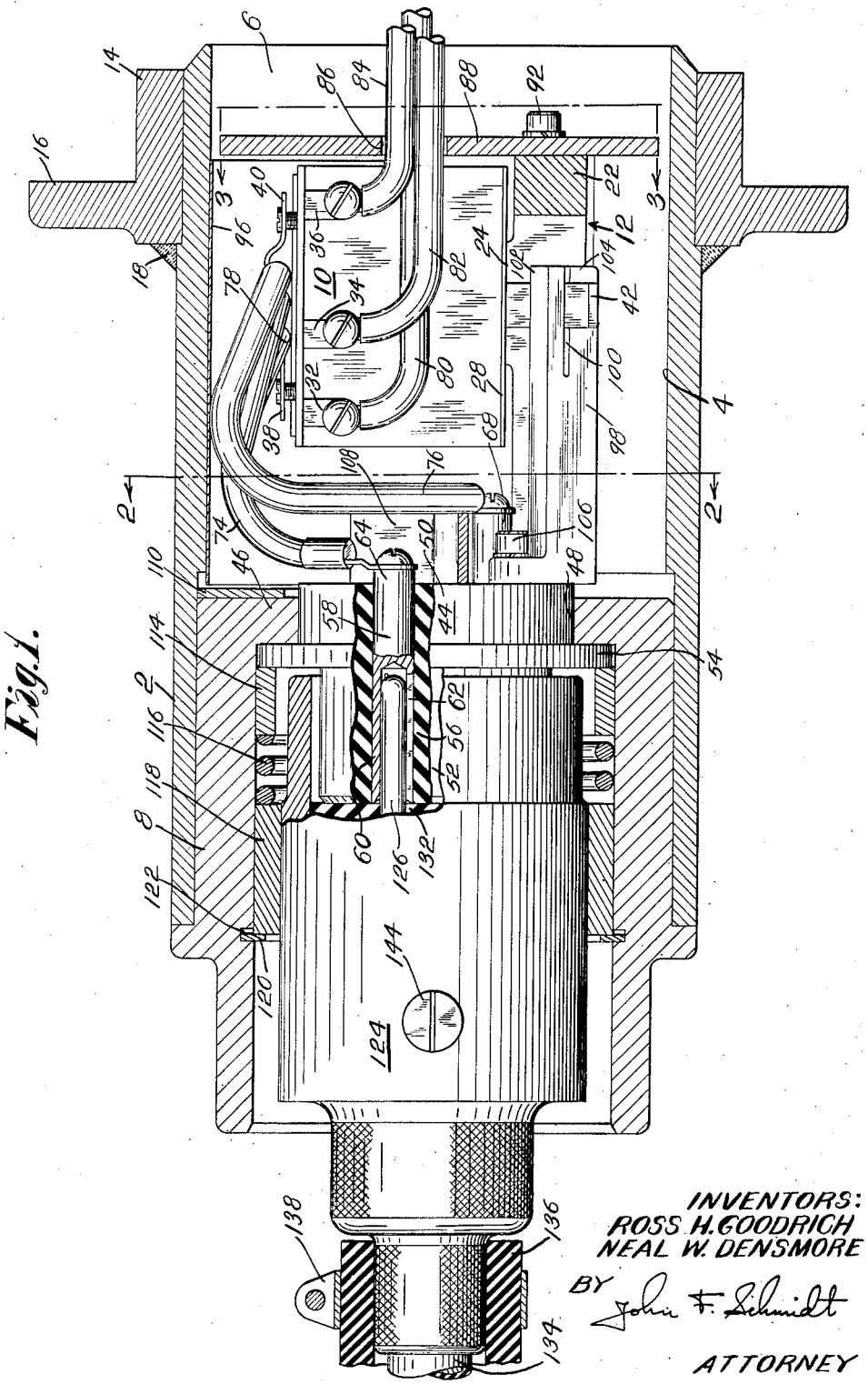
Fig. 1 is a partial sectional view through the axis of the device.

In the embodiment of the invention shown herein a main housing 2 is shown as provided with a stepped bore 4. One end (the right end as seen in Fig. 1) of the bore 4 forms part of an explosion-proof chamber 6. In the other end of the bore 4 a secondary or socket housing 8 is located. Means on the socket housing 8 are provided to mount an electric switch 10, the means comprising a generally rectangular frame 12 which is preferably integral with the secondary or socket housing 8 and extends into the explosion-proof chamber 6.

As will be understood by those skilled in the art, the main housing 2 is provided with a mounting ring 14 having a mounting flange 16. The mounting ring 14 is preferably welded to the main housing as shown at 18 and provides for securing the electric switch and power take-off device to a larger box which is of course also explosion-proof.

Figure 3:
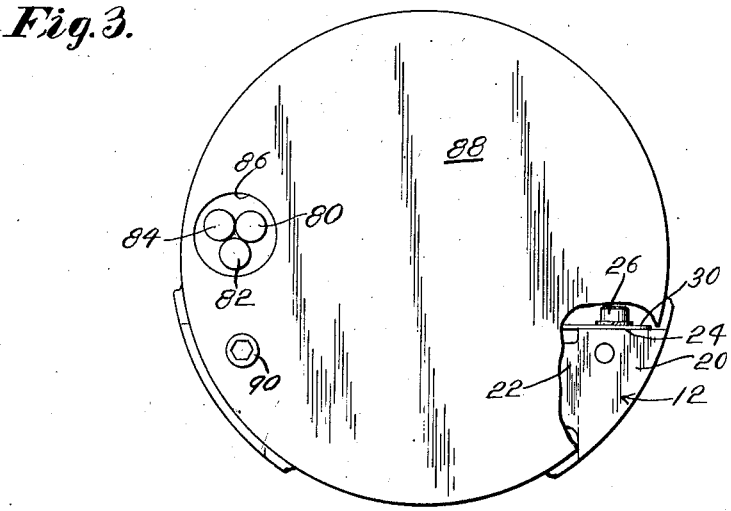
Fig. 3 is a view in section on line 3—3 of Fig. 1.

The generally rectangular switch mounting support 12 is shown as comprising a pair of side frame members 20 forming an integral part of the secondary housing 8, and having at their right ends as seen in Fig. 1 an integral transverse frame member 22. The side frame members 20 are preferably provided with switch mounting pads 24 which comprise simply slightly raised bosses on the side frame members 20, as is best seen in Figs. 1 and 3.

The electric switch 10 referred to above is mounted on the support 12 in the explosion-proof chamber 6 by being secured to the mounting pads 24. The switch 10 is securely held in place in any suitable manner as for example by threaded members, one of which is shown at 26 in Fig. 3, passing through suitable openings in flanges 28, 30 provided on the switch body and engaging threaded openings provided in the side frame members 20.

The switch 10 may be any one of a number of conventional electric switches provided with a plurality of terminals and an operating handle having usually an "off" position and an "on" position. The terminals are shown in this embodiment as being six in number, namely terminals 32, 34, 36, 38, 40, and one terminal which is hidden behind the wires shown in Fig. 1. The switch operating handle is shown at 42, and is there shown in its "switch off" position.

A socket support is indicated generally at 44. Means are provided rotatably to mount the socket support in the socket housing 8, the means comprising an end wall 46 in the socket housing 8. The end wall 46, which forms one end of the explosion-proof chamber 6, is provided with an opening 48 therethrough which serves as a bearing for the cylindrical member 50 of the socket support 44.

Figure 4:
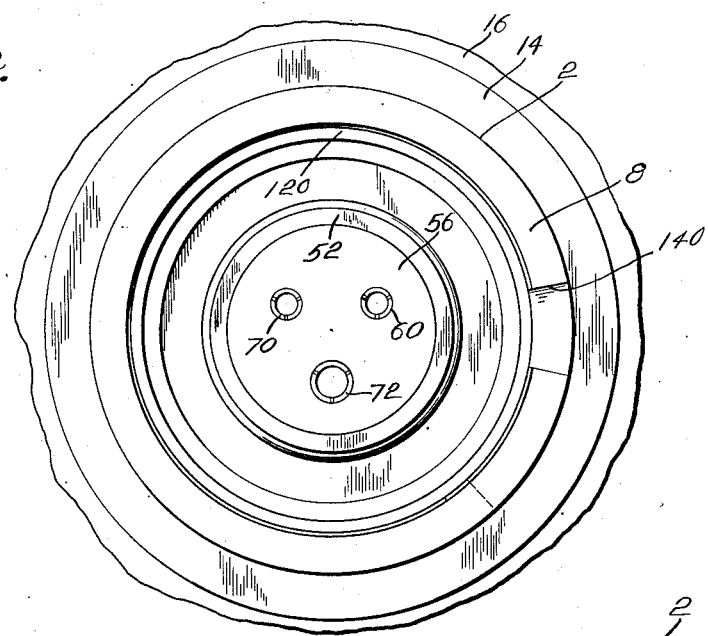
Fig. 4 is a view in elevation from the left end of the device seen in Fig. 1, but with the plug carrier removed.
Figure 5:
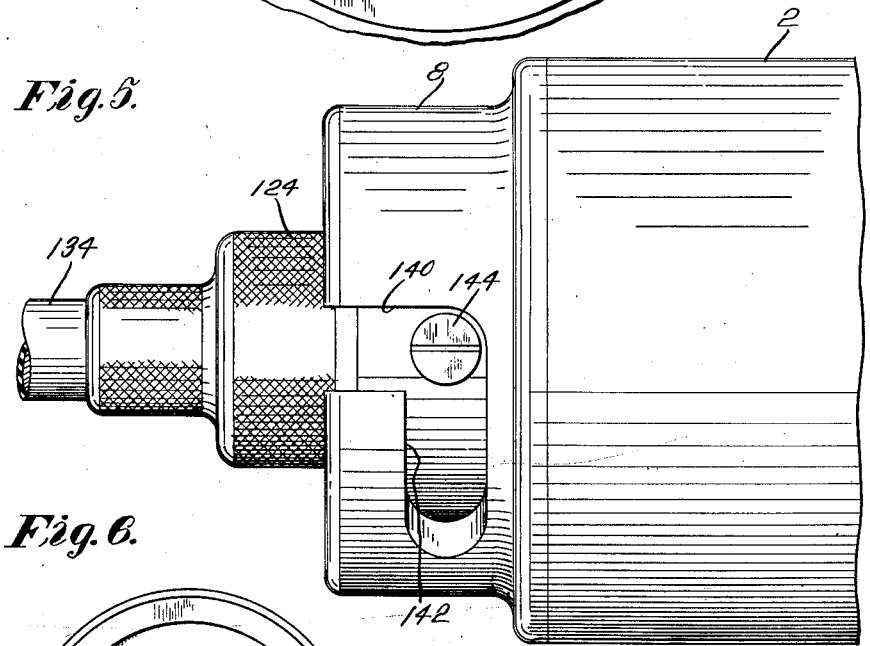
Fig. 5 is a side elevation view of the left end of the device as seen in Fig. 1, but shown without the protective cable sheath.
Figure 6:
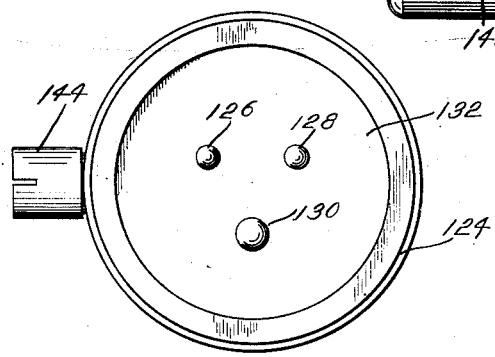
Fig. 6 is a view in elevation of the end of the plug carrier, namely as seen from the right end of Fig. 1.

The socket support 44 preferably comprises a hollow metal shell 52 having a flange or collar 54, the collar 54 being adapted to engage the left-hand (as seen in Fig. 1) face of end wall 46. The socket support further includes a filler 56 of any suitable insulating material such as rubber or the like, and a plurality of socket members, one of which is shown at 58 in Fig. 1. The socket member 58 comprises a socket end 60 which is slotted as shown at 62, and a terminal end 64. Other socket members are 66 and 68, best seen in Figs. 2 and 4. The socket member 58 is provided with a socket 60 as aforesaid which opens into the socket or secondary housing 8, and the socket members 66 and 68 are provided with sockets 70 and 72 respectively, also of course opening into the secondary housing 8 as shown in Fig. 4. It will be noted that the socket 72 is larger than the sockets 60 and 70, this difference being provided to prevent incorrect plugging of the plug and socket device.

The terminal 64 of socket member 58 is connected by an electrical conductor 74 with the switch terminal which does not show in Fig. 1. The terminal of socket member 68 is connected by a conductor 76 with switch terminal 40, and the terminal of socket member 66 is connected by a conductor 78 with switch terminal 36. The switch terminals 32, 34 and 36 are connected with conductors 80, 82 and 84 respectively, these conductors going back into the power outlet box in the direction of the source of electric power, as will be well understood by those skilled in the art. The conductors 80, 82 and 84 are shown as passing through a suitable opening 86 provided in a cover plate 88 which is secured in place by threaded members 90 and 92, the threaded members 90 and 92 passing through suitable openings in the cover plate 88 and engaging threaded openings in the transverse member 22 of the switch support 12.

A shell-like member 96 of any suitable insulating material is preferably secured to the outer surfaces of the side support members 20 by any suitable means such as threaded members, not shown.

Means are provided engaging the switch operating handle 42 and carried by the socket support 44 to operate handle 42 upon rotation of the socket support, said means comprising a bifurcated member 98 slotted as shown at 100 to provide the bifurcations 102 and 104, and being secured to the socket support 44 in any suitable manner as for example by threaded members 106.

Means are provided to prevent access to the switch handle 42 to operate it except by rotating the socket support 44, the means comprising the aforesaid end wall 46 having an opening through which the socket support passes and in which it is rotatably mounted. Thus the end wall 46 prevents operation of the switch 10 by someone reaching in and engaging the switch handle 42 to open or close the switch and mis-aline the sockets and plugs with respect to the polarizing device, as will be seen below.

Figure 2:
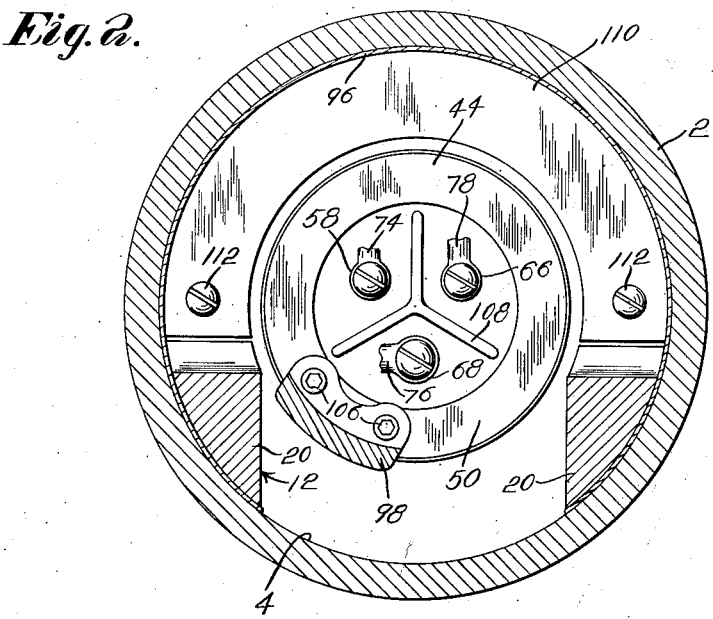
Fig. 2 is a view in section on line 2—2 of Fig. 1.

Referring now again to the socket support 44 and to the terminals of the socket members 58, 66 and 68, as is best seen in Fig. 2, an insulating barrier 108 is preferably provided between the terminals of the socket members. Insulating barrier 108 may be, and preferably is, integral with the insulating filler 56 of the socket support 44. For further assurance of insulation of the electrical conductors against grounding or short circuiting, an arcuate strip 110 of insulating material is preferably secured to the end wall 46 of the secondary housing by any suitable means as for example by the threaded members 112 (Fig. 2).

Means are provided in conjunction with the socket support 44 to insure an explosion-proof chamber 6 at the end defined by the end wall 46. To that end, means are provided to bias the flange 54 tight against the face of the end wall. These means are preferably yieldable means and include a sleeve 114, a coil spring 116, a second sleeve 118, a snap ring 120, and a recess 122 provided in the bore of the secondary housing 8. As will be understood by those skilled in the art, the coil spring 116 is compressed between the sleeves 114 and 118 and in this manner biases the flange 54 against the left face of end wall 46.

A plug carrier 124 is adapted to be inserted in the bore in the secondary housing 8. Plug carrier 124 carries plugs in such a number as to cooperate with the sockets of the socket members in the socket support. Thus, in the embodiment shown, the plug carrier 124 carries plugs 126, 128 and 130, the plug 130 being larger than the other two in order to fit in the larger socket of the three socket members. As will be well understood by those skilled in the art, the plugs are embedded in an insulating material, preferably rubber, shown at 132 and retained in the cylindrical metal shell of the plug carrier, and are connected in any suitable manner with conductors which are insulated from each other and which pass to the mining machine or other power utilizer in the mine through a cable 134 which is provided with additional protection such as the sheath shown at 136 secured by a clamping band 138 to the end of the plug carrier 124. The plurality of plugs engaging the plurality of sockets thus provide means to rotate the socket support by rotation of the plug carrier.

It will of course be understood by those skilled in the art that as much of the invention as is thus far described constitutes a useful invention, namely one which permits plugging in the cable before closing of the circuit and closing of the circuit after plugging in by simple rotation of the plug carrier. As an extra precaution, it is desirable to provide means to prevent insertion of the plug into its cooperating sockets unless the socket carrier is in a "switch-off" position. To accomplish this objective, means are provided to polarize the plug carrier and the secondary housing into which it is inserted.

The polarizing means include a slot member having an axial portion and a circumferential portion and a projection member cooperable with the slot member, one of the members being associated with the secondary housing and the other member being associated with the plug carrier. Thus, in the embodiment shown, the slot member has an axial portion 140 and a circumferential portion 142, and is shown as provided in the secondary housing, while the projection member 144 is shown as being provided in the plug carrier 124. However, it will be understood by those skilled in the art that the slot may be in the plug carrier and the projection on the housing.

*Operation*

In assembly at the factory, the device is made in such a way that the plug carrier and its electrically conductive plugs may be inserted only when the switch, and therefore the socket support 44, are in the "switch-off" position.

Thus, in use, an operator desiring to plug a mining machine into an electrical outlet or power take-off box, merely takes the plug carrier and inserts it in the bore of the secondary housing with the plug carrier turned so that the projection member 144 fits in the axial portion 140 of the slot member. If the device has been assembled correctly, and if the switch is "off," the plugs carried by the plug carrier will fit into their cooperating sockets, and moreover, inasmuch as the switch must be "off" if the plugs are to engage the sockets, the device may be safely plugged in without danger of any arc or spark.

After the plug carrier has been pushed fully home in order to effect a complete engagement of plugs and sockets, the operator rotates the plug carrier to move the projection member 144 circumferentially in the circumferential portion 142 of the slot member. In turning the plug carrier 124, the operator rotates not only the plug carrier, but also the socket support 44 and thus turns the handle actuating member 98 and moves the switch handle 42 from the "switch-off" position to the "switch-on" position. The circuit is thereupon completed and the machine may be operated as desired by the operator.

In order to disconnect the mining machine from the power take-off box, the operator must now first rotate the plug carrier in the opposite direction in order to first move the switch handle from the "switch-on" position to the "switch-off" position. It will be understood by those skilled in the art that the operator will not be able to pull the plug carrier out of the bore in the secondary housing without first rotating the plug carrier to turn the switch to the "switch-off" position as aforesaid. Thus, the operator is not able to simply pull the plug out while the circuit is completed and is thus prevented from forming or causing a spark or arc which might be dangerous in the presence of inflammable gases in the mine.

It will be understood by those skilled in the art that this invention provides a new and improved method of plugging electrical machinery into power take-off boxes in mines, and that this device is one which is simply and cheaply manufactured and yet is rugged and reliable in operation.

While there is in this application specifically described one form which the invention may assume in practice, it will be understood that this form of the same is shown for purposes of illustration, and that the invention may be modified and embodied in various other forms without departing from its spirit or the scope of the appended claims.

We claim:

1. An electrical circuit controlling device comprising a main housing having a bore one end of which is adapted to form part of an explosion-proof chamber, a secondary housing adapted to fit in the other end of the bore and having an end wall defining one end of the explosion-proof chamber, the end wall having an opening therethrough, a support carried by the end wall and extending into said chamber, a switch mounted on the support and having an operating element movable into a plurality of operating positions and a plurality of terminals, a socket support rotatably mounted in the opening in the end wall and forming a seal for that opening, a socket member carried by the socket support and having a socket opening into the secondary housing and a terminal extending into the explosion-proof chamber, an electrical conductor connected at one end to the socket terminal and at its other end to a switch terminal, a switch actuator carried by the socket support and having an arm in operating engagement with the operating element of the switch and adapted to move said element into its plurality of operating positions upon rotation of the socket support, a plug carrier insertable in the secondary housing, an electrically conductive plug carried by the plug carrier and cooperable with the socket member, and means including the cooperating plug and socket member to rotate the socket support by rotating the plug carrier.

2. A device as in claim 1, and polarizing means for said device, the polarizing means including a slot member having an axial portion and a circumferential portion, and a projection member cooperable with the slot member, one of said members being associated with the secondary housing and the other member being associated with the plug carrier.

3. In a device as in claim 2, a flange on the socket support cooperable with the end wall of the secondary housing to effect a seal, and means yieldingly to bias the flange against the end wall.

4. A device as in claim 3, in which the last-named means comprises a sleeve inside the secondary housing and having one end adjacent the flange, and a spring bearing against the other end of the sleeve and biasing the sleeve against the flange.

5. A device as in claim 1, in which the last-named means comprises a plurality of socket members carried by the socket support and a corresponding number of cooperating conductive plugs on the plug carrier.

6. In a power take-off device, a switch chamber, a socket housing, a switch support on the socket housing, a switch mounted on said support and having an operating element, a socket support rotatably mounted in the socket housing, means carried by the socket support to operate said element upon rotation of the socket support, means to prevent access to and operation of said element from outside the device except by means of the socket support, a socket member carried by the socket support and having a socket opening into the socket housing, a plug carrier insertable into the socket support, an electrically conductive plug on the plug carrier and insertable into the socket, and means including the cooperating plug and socket to rotate the socket support upon rotation of the plug carrier.

7. A device as in claim 6, and means to polarize the device including a slot and a cooperating projection whereby the plug cannot be inserted in the cooperating socket if the socket support is in the switch-on position.

8. A device as in claim 7, in which said access preventing means comprises an end wall on the socket housing, the wall having an opening therethrough, and in which the socket support is rotatably mounted in the opening in the end wall.

9. A device as in claim 8 wherein the switch chamber is explosion-proof, and a flange on the socket support cooperating with said end wall to provide a flame path for the explosion-proof chamber.

10. A device as in claim 6, in which said access preventing means comprises an end wall on the socket housing, the wall having an opening therethrough, and in which the socket support is rotatably mounted in the opening in the end wall.

11. A device as in claim 10 wherein the switch chamber is explosion-proof, and a flange on the socket support cooperating with said end wall to provide a flame path for the explosion-proof chamber.

12. In a plug and socket connecting device, a switch chamber, a socket housing, means on the socket housing to mount an electric switch, an electric switch on said mounting means and having an operating element, a socket support, means rotatably to mount the socket support in the socket housing, means engaging said element and carried by the socket support to operate said element upon rotation of the socket support, means to prevent access to said element to operate it except by rotating the socket support, a socket member carried by the socket support and having a socket opening into the socket housing, a plug carrier adapted to be inserted into the socket support, an electrically conductive plug carried by the plug carrier and insertable into the aforesaid socket, and means including the cooperating plug and socket to rotate the socket support upon rotation of the plug carrier.

13. A device as in claim 12, and means to prevent insertion of the plug into its cooperating socket unless the socket is in a switch-off position.

14. A device as in claim 13, in which said access preventing means comprises an end wall on the socket housing, the wall having an opening therethrough, and in which the socket support is rotatably mounted in the opening in the end wall.

15. A device as in claim 14, in which the element engaging and operating means comprises a bifurcated member mounted on the socket support to rotate therewith.

16. A device as in claim 15 wherein the switch chamber is explosion-proof, in which the switch mounting means comprises a generally rectangular frame mounted to extend into the explosion-proof chamber.

17. A device as in claim 12, in which said access preventing means comprises an end wall on the socket housing, the wall having an opening therethrough, and in which the socket support is rotatably mounted in the opening in the end wall.

18. A device as in claim 17, in which the element engaging and operating means comprises a bifurcated member mounted on the socket support to rotate therewith.

19. A device as in claim 12, in which the element engaging and operating means comprises a bifurcated member mounted on the socket support to rotate therewith.

ROSS H. GOODRICH.
NEAL W. DENSMORE.

References Cited in the file of this patent

UNITED STATES PATENTS

| Number | Name | Date |
|---|---|---|
| 978,841 | Buckton | Dec. 20, 1910 |
| 1,299,926 | Edwards | Apr. 8, 1919 |
| 1,700,437 | Hubbell | Jan. 29, 1929 |
| 1,971,990 | Reynolds et al. | Aug. 28, 1934 |
| 2,321,508 | Olley et al. | June 8, 1943 |